Patented Apr. 23, 1940

2,197,880

UNITED STATES PATENT OFFICE 2,197,880

AROMATIC POLYNUCLEAR POLYCARBOXYLIC ACIDS AND A PROCESS OF MAKING THEM

Rudolf Schröter, Leverkusen-Schlebusch, Heinrich Rinke, Leverkusen-Kuppersteg, and Hubert Eck, Cologne-Thielenbruch, Germany, assignors to I. G. Farbenindustrie Aktiengesellschaft, Frankfort-on-the-Main, Germany No Drawing. Application August 9, 1938, Serial No. 223,932. In Germany August 14, 1937

4 Claims. (Cl. 260—515)

The present invention relates to aromatic polynuclear polycarboxylic acids, especially of the diphenyl type, and to a process for their manufacture.

We have found that carboxylic acids of polynuclear aromatic compounds containing several carboxylic acid groups in the same nucleus can be prepared by condensing according to the Diels-Alder method, ethylene derivatives being substituted at one carbon atom by an aromatic radical and on the other carbon atom by a group being capable of activating the ethylene double bond like, for instance, —COOH, —CHO, —CN, —COCH$_3$, with a dialkyl butadiene, splitting off hydrogen and transforming the alkyl groups and, if desired, the group which has activated the ethylene double bond, into carboxylic acid groups.

Suitable starting materials are on the one hand such ethylene substitution products like, for instance, phenylacrylic acid, the substitution products and functional derivatives thereof, naphthylacrylic acids or other acrylic acids which are substituted in the β-position by an aromatic radical, acroleine derivatives being substituted in β-position by aromatic radicals, compounds of the type of benzalacetone and the like. As butadienes there come into consideration the 1.4-, 1.3- and 2.3-dialkyl-butadienes. Especially valuable polycarboxylic acids are obtained when starting from condensation products of 2.3-dialkyl-butadienes.

For splitting off hydrogen from the primary condensation products, several methods may be used, for instance, treating with potassium ferricyanide, heating with sulfur or a catalytical method. Transformation of the alkyl groups and of the original activating group of the ethylene derivative can be also performed in known manner, for instance, by oxidizing or by chlorinating and subsequently saponifying.

According to our process new polynuclear aromatic polycarboxylic acids can be obtained which contain several carboxylic acid groups in the same nucleus, for instance, diphenyl-tri- and tetracarboxylic acids containing three carboxylic acid groups in the same nucleus. These new carboxylic acids show the general characteristics of aromatic polycarboxylic acids; they yield, for instance, insoluble barium salts. The new polycarboxylic acids are valuable starting materials for the manufacture of dyestuffs and new intermediate products.

The following examples illustrate our present invention without, however, restricting it thereto, the parts being by weight:

Example 1

250 parts of cinnamic acid and 150 parts of 2.3-dimethyl-butadiene are condensed with the addition of 0.5 parts of hydroquinone for 5 hours at a temperature rising from 125° C. to 160° C. 375 parts of crude 1.2.3.6-tetrahydro-4.5-dimethyldiphenyl-2-carboxylic acid are thus obtained which on recrystallizing from alcohol melts at 158° C. The crude acid is purified by boiling with water. The splitting off of hydrogen is effected by heating a mixture of 230 parts of the said acid with 64 parts of sulfur to 180° C. and raising the temperature gradually to 205° C., as the formation of hydrogen sulfide slows down. The glassy melt thus obtained is extracted by means of a sodium carbonate solution, filtered and the filtrate acidified with hydrochloric acid, whereupon the 4.5-dimethyldiphenyl-2-carboxylic acid is sucked off and dried. It is obtained in a yield of 197 parts and has the melting point (from benzene) of 125° C.–126° C. The acid may also be isolated by distilling under reduced pressure, the boiling point being 210–220° C. at 12 mm.

For oxidizing the sodium carbonate extraction is employed directly, or 90.4 parts of the isolated dimethyl-diphenylcarboxylic acid are dissolved in the 4- to 5-fold quantity of water with the addition of caustic soda lye. To this solution there are added while stirring at 95° C–100° C. 240 parts of potassium permanganate, until the color of the solution changes. Thereupon the manganese dioxide precipitated is sucked off and rinsed with hot water. The filtrate is acidified by means of concentrated hydrochloric acid, until the reaction is acid to congo-paper, whereupon the precipitated acid is sucked off and rinsed with a small amount of water. 118 parts of diphenyl-2.4.5-tricarboxylic acid (melting point 225° C–226° C.) are thus obtained.

Example 2

When working according to Example 1, but replacing the cinnamic acid by p-chlorocinnamic acid, by condensing with 2.3-dimethyl-butadiene at 170° C.–180° C. the 1.2.3.6-tetrahydro-4.5-dimethyl-4'-chlorodiphenyl-2-carboxylic acid (melting point 149° C.–150° C.) is obtained in a yield of about 70%. From this acid the 4.5-dimethyl-4'-chlorodiphenyl-2-carboxylic acid (melting point 171° C.–174° C.) is obtained in a good yield by dehydrogenation. By oxidizing this acid the 4'-chlorodiphenyl - 2.4.5 - tricarboxylic acid is obtained which crystallizes from water in form of fine felted needles.

Example 3

From molecular amounts of 4-methoxycinnamic acid and 2.3-dimethylbutadiene there is obtained at 180° C. in an about 50% yield the 1.2.3.6 - tetrahydro - 4.5 - dimethyl - 4' - methoxydiphenyl-2-carboxylic acid (melting point 160° C.–161° C.). By dehydrogenating and oxidizing according to Example 1 the 4.5-dimethyl-4'-methoxydiphenyl-2-carboxylic acid and therefrom the 4'-methoxydiphenyl-2.4.5-tricarboxylic acid (melting point 228° C.–232° C.) is obtained in a yield of 75%.

Example 4

When treating p-tolylacrylic acid with molecular amounts of 2.3-dimethyl-butadiene according to Example 1, the 1.2.3.6-tetrahydro-4.5.4'-trimethyldiphenyl-2-carboxylic acid (melting point 132° C.) is obtained which is transformed into the 4.5.4'-trimethyldiphenyl-2-carboxylic acid (melting point 156° C.–160° C.) and then into the diphenyl-2.4.5.4'-tetracarboxylic acid which crystallizes from water in coarse needles.

Example 5

Molecular amounts of biphenyl-β-acrylic acid (melting point 224° C.–226° C.) and 2.3-dimethyl-butadiene are heated for 5 hours to 180° C.–200° C. with the addition of small amounts of hydroquinone. The 3.4-dimethyl-6-biphenyl-tetrahydrobenzoic acid thus obtained (melting point 203° C.–205° C.) is treated at 215° C.–220° C. with such an amount of sulfur as will be sufficient for effecting the splitting off of 2 mols of hydrogen. When the reaction is complete, the mixture is worked up as described in Example 1. On oxidizing the 4.5-dimethyl-terphenyl-1-carboxylic acid (melting point 195° C.–197° C.) thus obtained in a good yield is transformed into the terphenyl-2.4.5-tricarboxylic acid, which is purified by converting it into its barium salt. It shows a melting point of about 230° C.–235° C., only slight decomposition being observed.

Example 6

300 parts of benzalacetone and 0.5 parts of hydroquinone are heated in an autoclave with the addition of 175 parts of 2.3-dimethylbutadiene for 6 hours to 170° C.–175° C. Under reduced pressure (1–2 mm. Hg.) 430 parts of 3.4-dimethyl-6-phenyl-tetrahydroacetophenone distil as a thick oil, which is then heated with 128 parts of sulfur to 180° C.–215° C. The evolution of hydrogen sulfide being finished, the 2-aceto-4.5-dimethyldiphenyl can be distilled in a yield of 75% at 141° C.–143° C. and 4 mm. pressure. On recrystallizing from gasoline the reaction product melts at 79° C.–80° C.; it forms a semicarbazone having a melting point of 195° C.–197° C. By oxidizing the aceto compound with potassium permanganate at first in a weakly alkaline and thereafter in acid solution, the diphenyl-2.4.5-tricarboxylic acid of Example 1 is obtained.

We claim:

1. The process which comprises condensing ethylene derivatives which are substituted at one carbon atom by an aromatic radical and on the other carbon atom by a member of the group consisting of —COOH, —CHO, —CN and —CO.CH₃ radicals, with a dialkyl butadiene, heating the resulting product with sulfur and then causing potassium permanganate to react thereupon.

2. A process according to claim 1 in which the aromatic radical of the ethylene derivative is a radical of the benzene series.

3. As new products diphenyl-polycarboxylic acids containing at least three carboxylic acid groups in the same nucleus.

4. As a new product the 2.4.5-diphenyltricarboxylic acid having a melting point of 225–226°.

RUDOLF SCHRÖTER.
HEINRICH RINKE.
HUBERT ECK.